(12) United States Patent
Shekhar et al.

(10) Patent No.: US 11,212,850 B2
(45) Date of Patent: Dec. 28, 2021

(54) NETWORK SLICE SUPPORT OF RESPECTIVE TRANSPORT PROTOCOLS

(71) Applicant: Cisco Technology, Inc., San Jose, CA (US)

(72) Inventors: Ravi Shekhar, Maharastra (IN); Aeneas Sean Dodd-Noble, Andover, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 28 days.

(21) Appl. No.: 16/560,204

(22) Filed: Sep. 4, 2019

(65) Prior Publication Data

US 2020/0404718 A1     Dec. 24, 2020

(30) Foreign Application Priority Data

Jun. 19, 2019     (IN) .............................. 201921024363

(51) Int. Cl.
| | |
|---|---|
| H04B 7/00 | (2006.01) |
| H04W 76/10 | (2018.01) |
| H04W 16/02 | (2009.01) |
| H04W 80/06 | (2009.01) |

(52) U.S. Cl.
CPC ........... H04W 76/10 (2018.02); H04W 16/02 (2013.01); H04W 80/06 (2013.01)

(58) Field of Classification Search
CPC ... H04W 72/04; H04W 72/048; H04W 72/08; H04W 72/10; H04W 72/121; H04W 72/1215; H04W 28/0247
USPC ........................................ 370/310, 329, 349
See application file for complete search history.

(56) References Cited

U.S. PATENT DOCUMENTS

| | | | |
|---|---|---|---|
| 10,268,474 B2 * | 4/2019 | Stammers | ................. G06F 8/65 |
| 10,284,730 B2 * | 5/2019 | Shaw | .................. H04L 12/1417 |
| 10,285,155 B1 | 5/2019 | Dodd-Noble et al. | |
| 10,356,838 B2 * | 7/2019 | Salkintzis | ............. H04W 48/18 |

(Continued)

OTHER PUBLICATIONS

R. Ferrus et al., "Management of Network Slicing in 5G Radio Access Networks: Functional Framework and Information Models", https://arxiv.org/abs/1803.01142, Mar. 3, 2018, 16 pages.

(Continued)

*Primary Examiner* — Dmitry Levitan
(74) *Attorney, Agent, or Firm* — Edell, Shapiro & Finnan, LLC

(57) ABSTRACT

Techniques are described herein for network slice support of respective transport protocols. In one example, a session management function obtains, from a user equipment, a request for a network slice identifier in a network that includes a plurality of network slices each configured to support a respective transport protocol. In response to the request, the session management function identifies a first transport protocol of the respective transport protocols by which the user equipment is to communicate. Based on the first transport protocol, the session management function identifies a first network slice of the plurality of network slices by which the user equipment is to communicate. The first network slice is configured to support the first transport protocol. The session management function provides the network slice identifier to the user equipment. The network slice identifier corresponds to the first network slice.

20 Claims, 6 Drawing Sheets

(56) References Cited

U.S. PATENT DOCUMENTS

| | | | | |
|---|---|---|---|---|
| 10,470,218 | B2* | 11/2019 | Salot | H04W 74/0833 |
| 10,512,109 | B2* | 12/2019 | Myhre | H04W 4/70 |
| 10,644,955 | B2* | 5/2020 | Zhang | H04L 41/12 |
| 10,735,956 | B2* | 8/2020 | Bae | H04W 12/04 |
| 10,736,029 | B1* | 8/2020 | Young | H04W 40/246 |
| 10,863,556 | B2* | 12/2020 | Lau | H04W 48/10 |
| 2017/0164349 | A1 | 6/2017 | Zhu et al. | |
| 2019/0141169 | A1* | 5/2019 | Ni | H04L 69/329 |
| 2019/0223047 | A1 | 7/2019 | Gundavelli et al. | |
| 2020/0137621 | A1* | 4/2020 | Yang | H04W 76/27 |
| 2020/0221346 | A1* | 7/2020 | Park | H04L 41/5041 |
| 2020/0389843 | A1* | 12/2020 | Huang | H04W 48/18 |
| 2020/0404718 | A1* | 12/2020 | Shekhar | H04W 16/02 |
| 2021/0084526 | A1* | 3/2021 | Wu | H04W 28/0273 |
| 2021/0204207 | A1* | 7/2021 | Fiorese | H04W 8/08 |

OTHER PUBLICATIONS

3GPP, "3rd Generation Partnership Project; Technical Specification Group Services and System Aspects; System Architecture for the 5G System; Stage 2 (Release 16)", 3GPP TS 23.501 V16.1.0, Jun. 2019, 368 pages.

3GPP, "3rd Generation Partnership Project; Technical Specification Group Services and System Aspects; Management and orchestration; Concepts, use cases and requirements (Release 15)", 3GPP TS 28.530 V15.1.0, Dec. 2018, 28 pages.

3GPP, "3rd Generation Partnership Project; Technical Specification Group Services and System Aspects; Management and orchestration; Provisioning; (Release 16)", 3GPP TS 28.531 V16.2.0, Jun. 2019, 65 pages.

3GPP, "3rd Generation Partnership Project; Technical Specification Group Services and System Aspects; Management and orchestration; Generic management services; (Release 16)", 3GPP TS 28.532 V16.0.0, Jun. 2019, 180 pages.

3GPP, "3rd Generation Partnership Project; Technical Specification Group Core Network and Terminals; 5G System; Network Function Repository Services; Stage 3 (Release 15)", 3GPP TS 29.510 V15.3.0, Mar. 2019, 121 pages.

3GPP, "3rd Generation Partnership Project; Technical Specification Group Core Network and Terminals; Study on User Plane Protocol in 5GC. (Release 16)", 3GPP TR 29.892 V1.1.0, Apr. 2019, 47 pages.

Cisco Systems et al., "Pseudo-CR on Discovery of SRv6 capable UPF", 3GPP TSG-CT WG4 Meeting #89, Feb. 25-Mar. 1, 2019, 4 pages.

C. Filsfils et al., "SRv6 Network Programming", draft-filsfils-spring-srv6-network-programming-06, Oct. 22, 2018, 55 pages.

S. Previdi, Ed. et al., "IPv6 Segment Routing Header (SRH)", draft-ietf-6man-segment-routing-header-06, Mar. 13, 2017, 35 pages.

S. Matsushima et al., "Segment Routing IPv6 for Mobile User Plane", draft-ietf-dmm-srv6-mobile-uplane-04, Mar. 11, 2019, 28 pages.

Wikipedia, "GPRS Tunnelling Protocol", last edited Jun. 5, 2019, 7 pages.

Tony Saboorian et al., "Network Slicing and 3GPP Service and Systems Aspects (SA) Standard", https://sdn.ieee.org/newsletter/december-2017/network-slicing-and-3gpp-service-and-systems-aspects-sa-standard, Dec. 2017, 7 pages.

K. Bogineni et al., "Optimized Mobile User Plane Solutions for 5G", draft-bogineni-dmm-optimized-mobile-user-plane-01, Jun. 29, 2018, 65 pages.

Huawei et al., "Network Slice instance selection", SA WG2 Meeting #122 S2-175296, Jun. 26-30, 2017, 22 pages.

Cisco et al., "IPv6 Segment Routing (SRv6) Interoperability Results", MPLS World Congress, Apr. 2019, 14 pages.

S.Matsushima et al., "SRv6 for Mobile User-Plane", draft-ietf-dmm-srv6-mobile-uplane-01, downloaded Jun. 10, 2019, 56 pages.

Tech-invite, "Ti+ for TS 23.502—§4.3.2.2.1", https://www.tech-invite.com/fo-5gs/tinv-fo-5gs-502-ps01-01.html, downloaded Jul. 9, 2019, 4 pages.

Chih-Lin I et al., "End to End Network Slicing", White Paper 3, OUTLOOK 21, Nov. 2017, 40 pages.

* cited by examiner

NETWORK SLICE SUPPORT OF RESPECTIVE TRANSPORT PROTOCOLS

PRIORITY CLAIM

This application claims priority to Indian Provisional Application No. 201921024363, filed Jun. 19, 2019, the entirety of which is incorporated herein by reference.

TECHNICAL FIELD

The present disclosure relates to telecommunications technology.

BACKGROUND

A network slice is a logical network that may be dedicated to one or more User Equipments. There are typically multiple network slices running in parallel on a single platform or set of functions, with each network slice serving a respective use case (e.g., Internet of Things (IoT), broadband, low latency, etc.). Network slicing may enable service providers to provide customized service to end users.

DESCRIPTION OF EXAMPLE EMBODIMENTS

Overview

Techniques are presented for network slice support of respective transport protocols. In one example embodiment, a session management function obtains, from a user equipment, a request for a network slice identifier in a network that includes a plurality of network slices each configured to support a respective transport protocol. In response to the request, the session management function identifies a first transport protocol of the respective transport protocols by which the user equipment is to communicate. Based on the first transport protocol, the session management function identifies a first network slice of the plurality of network slices by which the user equipment is to communicate. The first network slice is configured to support the first transport protocol. The session management function provides the network slice identifier to the user equipment. The network slice identifier corresponds to the first network slice.

Example Embodiments

Figure 1:
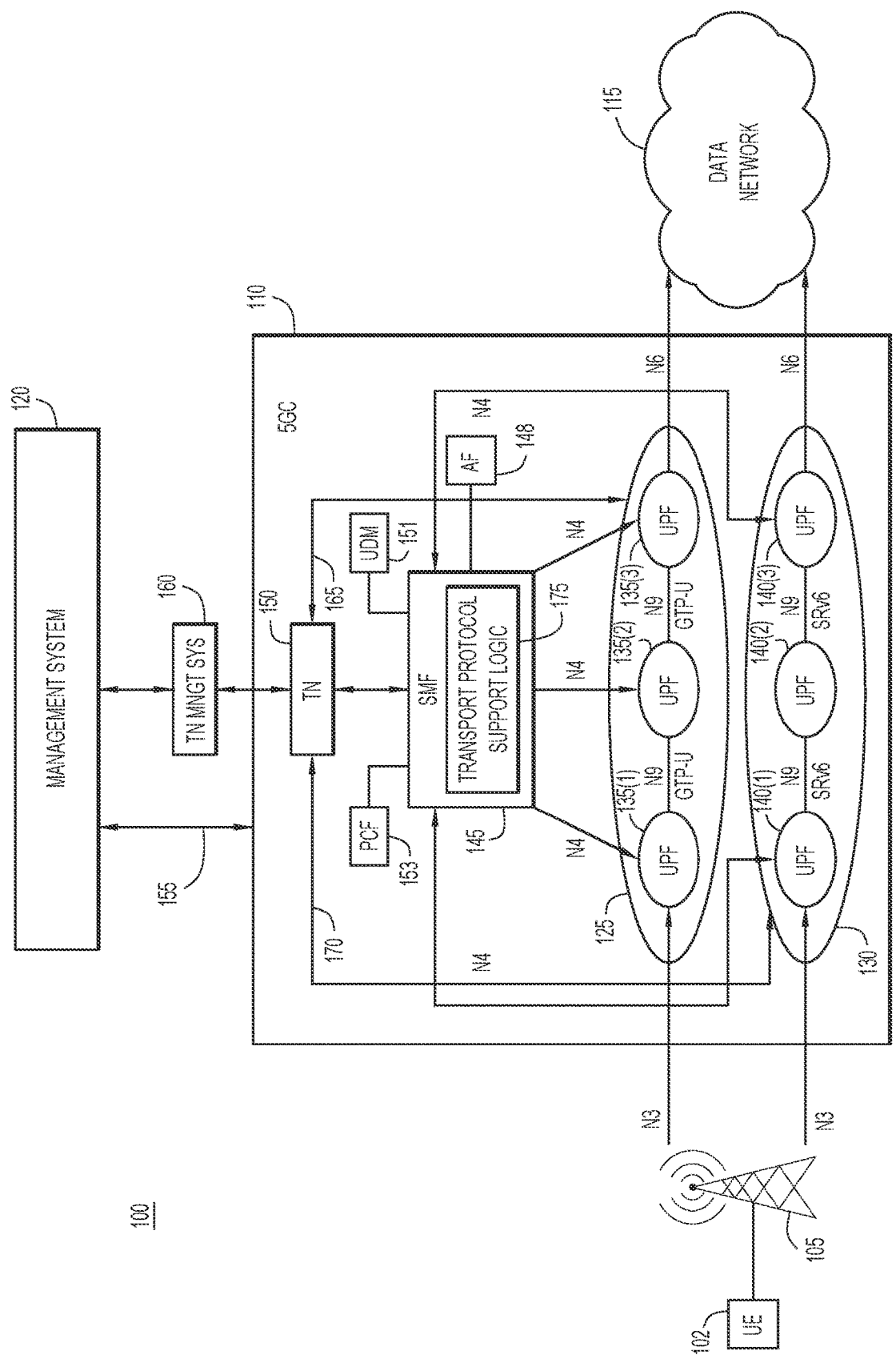
FIG. 1 illustrates a system configured for network slice support of respective transport protocols, according to an example embodiment.

FIG. 1 illustrates a system 100 configured for network slice support of respective transport protocols. System 100 includes User Equipment (UE) 102 (e.g., mobile phone, laptop, etc.), gNodeB 105, 5G Core Network (5GC) 110, Data Network (DN) 115 (e.g., the Internet), and management system 120. gNodeB 105 is a base station configured to facilitate network communications between UE 102 and 5GC 110. 5GC 110 includes network slices 125 and 130, each having a corresponding network slice Identifier (ID). Network slice 125 includes User Plane Functions (UPFs) 135(1)-135(3), and network slice 130 includes UPFs 140(1)-140(3). It will be appreciated that, in general, a network slice may include any suitable number of UPFs. gNodeB 105 is configured to communicate with UPFs 135(1) and 140(1) via respective N3 interfaces, and UPFs 135(3) and 140(3) are configured to communicate with DN 115 via respective N6 interfaces. UPFs 135(1)-135(3) are configured to communicate with one another via N9 interfaces, and UPFs 140(1)-140(3) are configured to communicate with one another via separate N9 interfaces.

5GC 110 further includes Session Management Function (SMF) 145, Application Function (AF) 148, Transport Network (TN) 150, Unified Data Management (UDM) 151, and Policy Control Function (PCF) 153. SMF 145 may be configured to manage/configure UPFs 135(1)-135(3) and 140(1)-140(3) via N4 interfaces. Management system 120 may be configured to perform management, orchestration, and provisioning operations with respect to 5GC 110 (e.g., network slices 125 and 130). In particular, management system 120 may be configured to manage 5GC 110, as represented by arrow 155, and may be further configured to manage TN 150 via TN management system 160. TN 150 may communicate with network slices 125 and 130, as represented by arrows 165 and 170. UDM 151 may store subscription information. PCF 153 may provide policy rules to other network functions for enforcement.

In this example, UPFs 135(1)-135(3) are configured to communicate via General Packet Radio Service (GPRS) Tunneling Protocol User plane (GTP-U). GTP-U is an Internet Protocol (IP) based transport protocol with relatively limited capabilities. Meanwhile, Segment Routing for IP version 6 (IPv6) (SRv6) supports functions which are not available (or at least not as efficient) over GTP-U, such as network programming, traffic engineering, fast rerouting, UPF state reduction, Ultra-Reliable and Low-Latency Communications (URLLC) use cases where network packets can be delivered in accordance with a given Service Level Agreement (SLA), end-to-end slicing, etc. Nonetheless, it is expected that many 5GCs will initially implement GTP-U. As such, while SRv6 may be preferable for use in a 5GC, any implementation of SRv6 in a 5GC will likely need to co-exist with existing GTP-U implementations in the same 5GC. There is currently no well-defined method for enabling co-existence of different transport protocols such as SRv6 and GTP-U.

Accordingly, transport protocol support logic 175 is provided in SMF 145 to enable seamless co-existence of transport protocols in system 100. This may be accomplished through correlation of transport capabilities with UPF capabilities. In particular, 5GC 110 includes a plurality of network slices 125 and 130 each configured to support a respective transport protocol (here, GTP-U and SRv6). In one example, SMF 145 may obtain, from UE 102, a request for a network slice ID. In response to the request, SMF 145 may identify a first transport protocol (e.g., SRv6) by which UE 102 is to communicate. Based on the first transport protocol, SMF 145 identifies network slice 130, which is configured to support SRv6. Thus, UE 102 is to communicate via network slice 130. SMF 145 may provide to UE 102 the network slice ID which corresponds to network slice 130. UE 102 may thereby provide subsequent SRv6 communications to DN 115 over network slice 130.

Accordingly, transport protocol support logic 175 may enable segregation of different types of transport traffic (e.g., GTP-U may be independent from SRv6). That is, network operators may split network traffic between UPFs 135(1)-135(3) (GTP-U) and UPFs 140(1)-140(3) (SRv6) such that configuration, deployment, and scaling of the different transport protocols occur independently from each other. Network operators may institute policies to route existing legacy traffic (e.g., typical Internet traffic) on network slice 125 (GTP-U) and traffic for specific 5G use cases (e.g., URLLC traffic) on network slice 130 (SRv6). Network operators may also launch a network slice with a new transport protocol (e.g., network slice 130) without disturbing an existing network slice (e.g., network slice 125). This may enable smooth transfer of existing data traffic to SRv6 slices. Thus, UPFs 140(1)-140(3) may interwork smoothly with UPFs 135(1)-135(3) without impacting existing network traffic. Furthermore, SMF 145 may discover, select, and configure UPFs 140(1)-140(3) to communicate via SRv6.

In one example, UPF 140(1) may serve as an Intermediate UPF (I-UPF) that converts GTP-U traffic to SRv6 traffic. This may be helpful because N3 interfaces are not typically SRv6 compatible, and therefore UE 102 cannot provide SRv6 traffic directly to 5GC 110. Whereas an I-UPF is typically used for Uplink Classifier (UL/CL) or Branching Point (BP), in this example UPF 140(1) may be used for transport protocol switching and enhancing the network capability by communicating with the applications.

While the description of the techniques presented herein are made with respect to a 5G network technology, this is not meant to be limiting. These techniques are applicable to any mobile network technology. Thus, the terminology of the various components referred to herein is not meant to be limited to 5G network components, and are applicable to any such components that operate in a similar manner, albeit supporting other network technologies now known or hereinafter developed.

Figure 2:
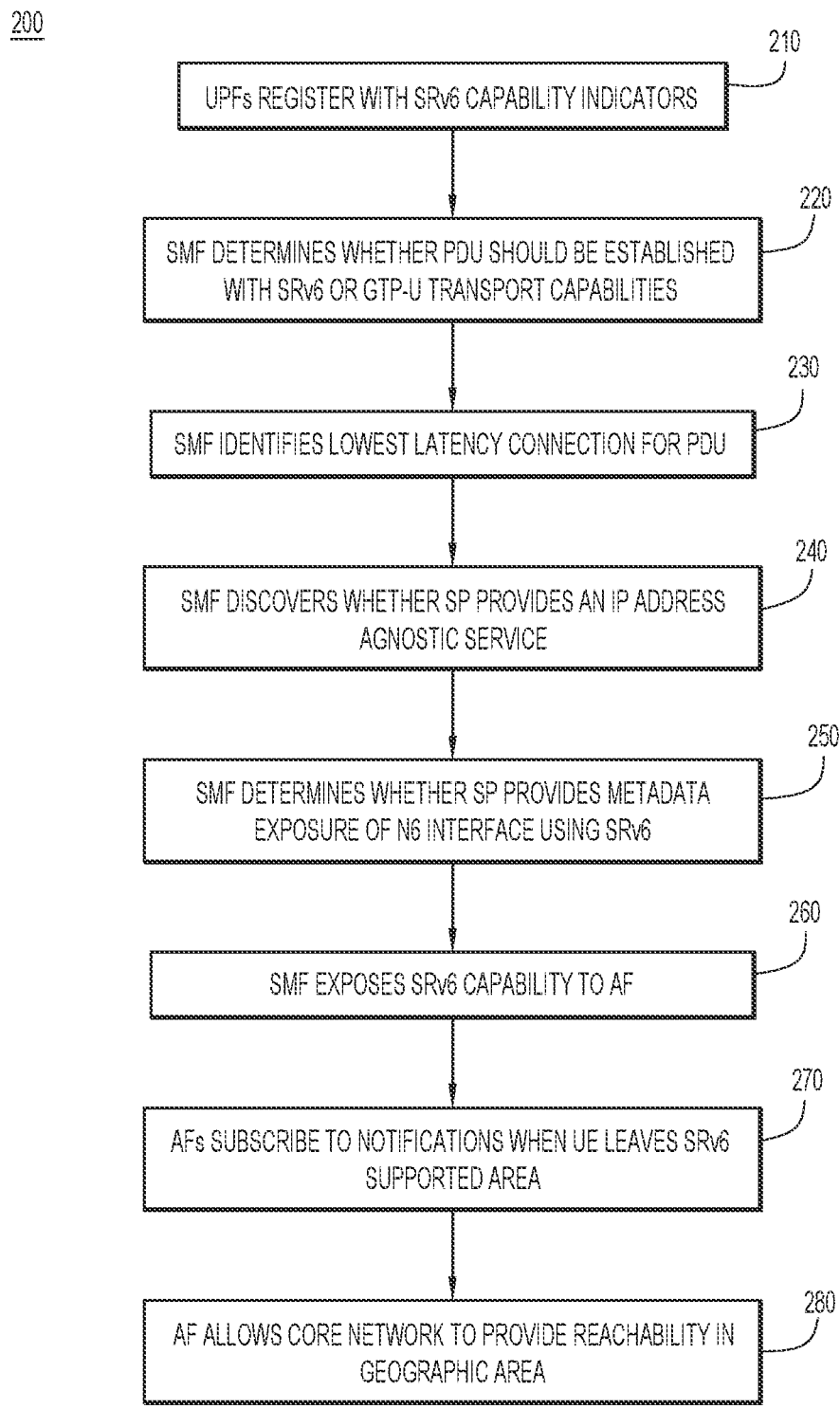
FIG. 2 illustrates a flowchart of a method for a User Plane Function to register its transport capability with a Session Management Function (SMF) and for the SMF to select an appropriate transport slice for a given Protocol Data Unit (PDU) session for User Equipment, according to an example embodiment.

Turning now to FIG. 2, and with continued reference to FIG. 1, shown is a flowchart of a method 200 for initiating and maintaining a Protocol Data Unit (PDU) session for UE 102. At 210, UPFs 140(1)-140(3) register with SRv6 capability indicators to a Network Function (NF) Repository Function (NRF) to indicate that UPFs 140(1)-140(3) are SRv6-capable (e.g., connected to an SRv6-capable TN). This initial UPF registration may include a feature set of SRv6 Segment IDs (SIDs) corresponding to UPFs 140(1)-140(3), for example. This "day-zero" operation may inform 5GC 110 that UPFs 140(1)-140(3) are SRv6-capable, and may be used to subsequently select SRv6 capable feature(s). In one example, Network Function Virtualization Orchestrator (NFVO) and Operations, Administration, and Management (OAM) may be used to initially establish network slices 125 and 130 and configure the SRv6 capabilities before UPFs 140(1)-140(3) register with SRv6 capability indicators. In other words, network slices 125 and 130 may be pre-provisioned for subsequent dynamic selection using NFVO/OAM. Network slices may be configured based on one or more SLAs.

An SRv6 capability indicator may be a free text field that allows UPFs 140(1)-140(3) to indicate that they are SRv6-capable. The SRv6 capability indicators may further permit UPFs 140(1)-140(3) to indicate the particular flavor(s) of SRv6 for which they are capable. The flavors of SRv6 may include traditional mode and enhanced mode. Enhanced mode enables additional functions such as using metadata in the SRv6 network packet to advertise capabilities outside system 100 or performing IP address agnostic forwarding. Enhanced mode may be a superset of traditional mode such that network slice 130 may include a mix of UPFs 140(1)-140(3) configured for traditional or enhanced mode. Thus, operation 210 may inform SMF 145 that UPFs 140(1)-140(3) are SRv6-capable and may further indicate the flavor(s) of SRv6 for which UPFs 140(1)-140(3) are configured.

At 220, SMF 145 obtains a request for a network slice ID from UE 102 and determines whether the PDU should be established with SRv6 or GTP-U transport capabilities. The request for a network slice ID may be a PDU session establishment request (e.g., Network Slice Selection Assistance Information (NSSAI)). SMF 145 may obtain the request for a network slice ID and retrieve an indication of the service provider of UE 102 from UDM 151 and/or the Network Data Analytics Function (NWDAF). SMF 145 may determine whether the PDU session should be established with SRv6 or GTP-U transport capabilities based on the geographical location of UE 102 and the particular UPF(s) to which UE 102 can potentially connect (e.g., UPF 140(1)) as well as the network topology of 5GC 110. The network topology may inform SMF 145 whether the UPF to which UE 102 can potentially connect (e.g., UPF 140(1)) is SRv6 capable. In this example, SMF 145 decides to use SRv6 to transport network communications associated with UE 102. Where UPF 140(1) serves as an I-UPF, SMF 145 may determine that the I-UPF can be inserted through N9 extensions (rather than N4 or N16'/N4 extensions) based on UPFs 135(1)-135(3) and 140(1)-140(3) registering their capabilities at operation 210. Thus, SMF 145 may determine which transport protocol to use based on a correlation of transport protocols, UPF capability support, and the PDU profile of UE 102.

At 230, SMF 145 identifies the lowest latency connection for the PDU session to determine the appropriate (SRv6-capable) UPF to which UE 102 should connect. SMF 145 may use a Path Computation Engine (PCE) in communication with SMF 145 and/or one or more of UPFs 140(1)-140(3) to make this identification based further on Data Network Name (DNN), Data Network Access ID (DNAI), and network load. This may be particularly advantageous for URLLC PDU sessions or for UL/CL use cases.

At 240, SMF 145 discovers whether the service provider provides an IP address agnostic service. The IP address agnostic service may be a service for adaptively rerouting user plane traffic, for example. SMF 145 may discover that the service provider provides an IP address agnostic service via an extension to the N10 interface with UDM 151. UDM 151 may indicate to SMF 145 that an IP address agnostic service is supported. Alternatively, PCF 153 may push the indication that an IP address agnostic service is supported to SMF 145 as a packet flow rule. SMF 145 may apply the packet flow rule which activates the service on the appropriate UPF (e.g., UPF 140(1)) and TN 150. In one example, UDM 151 and the PCF 153 are slice common NFs.

At 250, SMF 145 discovers whether the service provider provides metadata exposure of the N6 interface using SRv6. The metadata may be included in an SRv6 header, and may include network capabilities encapsulated over the N6 interface. For example, UPF 140(1) may insert the metadata as part of an IPv6/SRv6 header before sending the packet to UPF 140(2) over the N9 interface. UPF 140(2) may send the packet to UPF 140(3), which may send the packet to DN 115 over the N6 interface. UPF 140(1) (and/or UPF 140(2) and/or UPF 140(3)) may expose this function to SMF 145, which may enable/disable this function based on a policy from a Policy and Charging Control (PCC) function or through local configuration. If the service provider allows for metadata exposure of the N6 interface using SRv6, DN 115 may thereby obtain the network metadata. In one example, the PCF 153 may be configured with the DNAI and, based on the location of UE 102, may indicate to SMF 145 to insert/instantiate a UPF (e.g., UPF 140(1)) capable of performing metadata encapsulation over the N9 and N6 interfaces. SMF 145 may activate the metadata exposure service using the PCC or Packet Flow Description (PFD) rules. For example, SMF 145 may insert a PFD to provide the SRv6 metadata over the N6 interface. UPF 140(1) may be inserted as an I-UPF for generation of metadata on the SRv6 user plane to provide validated applications with network capabilities.

Based on operations 230-250 (e.g., latency, IP address agnostic service, and SRv6 metadata), SMF 145 may determine the UPF to which UE 102 is to connect. In this example, that UPF is UPF 140(1). It will be appreciated that SRv6 support on TN 150 and UPF 140(1) may be introduced in phases and for particular use cases. Many of these use cases do not warrant selection of an entire network slice (e.g., network slice 130) but rather a subset of UPFs controlled by SMF 145 (e.g., UPFs 140(1) and/or 140(2) and/or 140(3)). Thus, SMF 145 may identify UPF 140(1), which is configured to support SRv6, as the UPF by which UE 102 is to communicate.

At 260, upon determining that the PDU session should use SRv6, SMF 145 may expose this capability to AF 148, which may control one or more applications. In one example, the capability may be exposed through the PCF 153 or Network Exposure Function (NEF) using enhancements to the Npcf or Nnef interfaces. AF 148 may thereby influence SRv6 network traffic routing in network slice 130 based on information received in response to a request for the topology of 5GC 110 and the particular application(s).

At 270, AF 148 may subscribe to notifications when UE 102 leaves an SRv6 supported/capable coverage area (e.g., a geographic area). In one example, the PCF 153 or NEF may indicate the SRv6 supported coverage area to AF 148 and request AF 148 to determine whether the SRv6 services should be enabled. When UE 102 leaves the SRv6 supported coverage area, AF 148 (and its associated applications) may be informed that optimized (e.g., SRv6) transport is not available.

At 280, based on the location of UE 102, AF 148 may allow 5GC 110 to provide reachability in another area (e.g., a campus area). For example, AF 148 may decide whether to allow the reachability. If so, AF 148 may push a new rule to the PCF 153 which in turn indicates as much to SMF 145. SMF may send a new rule to UPF 140(1) (for example) using an N4 interface. For instance, AF 148 may provide a policy indicating that UE 102 is in a locale where an application controlled by AF 148 is enabled, and therefore UL/CL is to be activated. UL/CL may enable UPF 140(1) to divert SRv6 network traffic to DN 115. This may also be activated based on the indication of the SRv6 capability of UPF 140(1) provided to the NRF and the correlation of the network traffic with TN 150 to ensure that service can be satisfactorily delivered.

Alternatively, SMF 145 may obtain an indication that SRv6 is no longer available for UE 102 and provide the indication to AF 148. SMF 145 may further identify GTP-U and network slice 125 by which UE 102 is to communicate now that SRv6 is no longer available. In other words, SMF 145 may seamlessly switch between transport protocols for UE 102. SMF 145 may select network slice 125 using a correlation of transport capability and UPF capability to determine whether the PDU session should be established with GTP-U or SRv6. The applications that can use SRv6 may be notified of the ability to use an SRv6 capability and/or the loss of that capability when UE 102 moves between base stations (e.g., from gNodeB 105 to another base station).

Figures 3A, 3B:
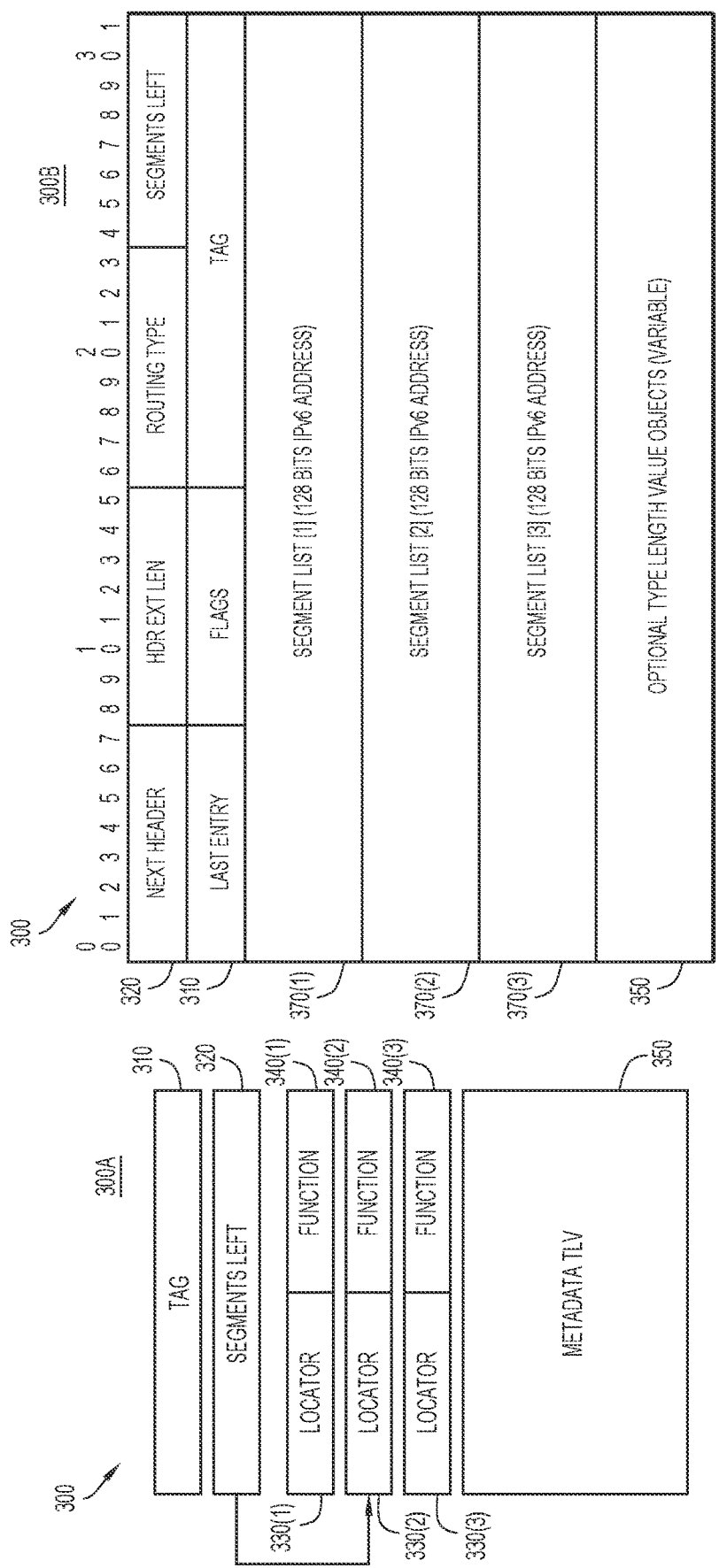
FIGS. 3A and 3B illustrate a Segment Routing for IP version 6 (IPv6) (SRv6) header, according to an example embodiment.

FIGS. 3A and 3B illustrate an example SRv6 header 300. Turning first to FIG. 3A, shown is a logical diagram 300A of SRv6 header 300. SRv6 header 300 includes tag field 310, segments left field 320, locator fields 330(1)-330(3), function fields 340(1)-340(3), and metadata type-length-value field 350. Tag field 310 may include a tag which classifies the packet encapsulated in SRv6 header 300 in some manner (e.g., as belonging to a group of packets sharing similar properties). Segments left field 320 may include an index of the next segment to inspect. In this example, the next segment to inspect is the segment including locator 330(2) and function 340(2). Locator fields 330(1)-330(3) may include an indication of a network node performing corresponding functions specified in function fields 340(1)-340(3). Metadata type-length-value field 350 may include metadata discussed above in relation to operation 250 (FIG. 2).

FIG. 3B illustrates a datagram 300B of SRv6 header 300. Tag field 310, segments left field 320, and metadata type-length-value field 350 are shown in their respective allocated octets/bits. Segment list fields 370(1)-370(3) may include locator fields 330(1)-330(3)/functions fields 340(1)-340(3).

Figure 4:
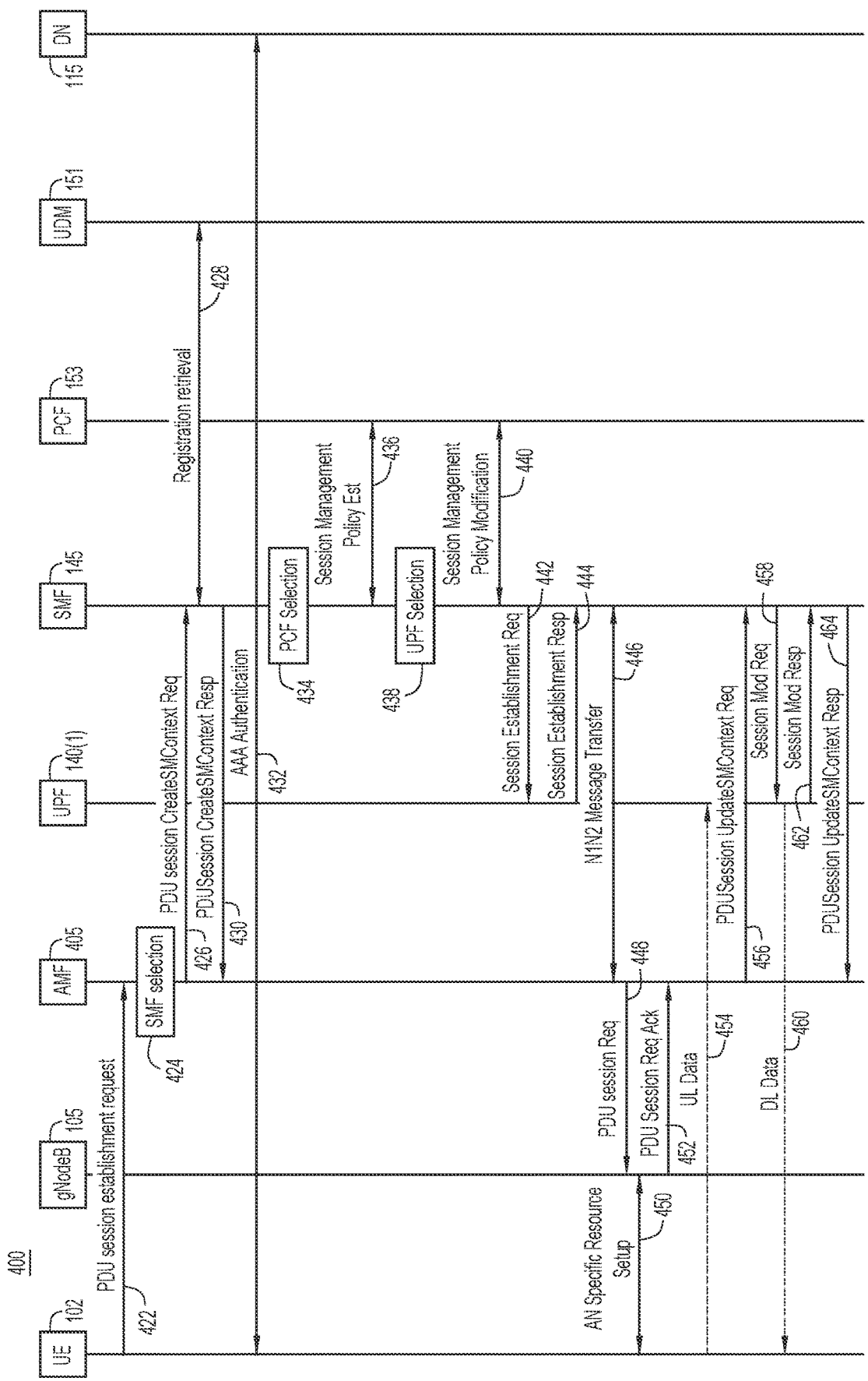
FIG. 4 illustrates a call flow diagram of a method for PDU session establishment in a system configured for network slice support of respective transport protocols, according to an example embodiment.

With continuing reference to FIG. 1, FIG. 4 illustrates a call flow diagram of a method 400 for PDU session establishment. Method 400 involves operations between UE 102, gNodeB 105, UPF 140(1), SMF 145, PCF 153, UDM 151, and DN 115. Method 400 also involves further operations associated with Access and Mobility Management Function (AMF) 405.

At 422, UE 102 sends a PDU session establishment request to AMF 405. At 424, AMF 405 selects SMF 145. At 426, AMF 405 sends, via the Nsmf interface, a PDU session create session management context request to SMF 145. At 428, SMF 145 retrieves subscriber registration information associated with UE 102 from UDM 151. At 430, SMF 145 sends, via the Nsmf interface, a PDU session create session management context response to AMF 405. At 432, UE 102 is authenticated (e.g., via an Authentication, Authorization, and Accounting (AAA) server) for communication with DN 115. At 434, SMF 145 selects PCF 153 and, at 436, establishes a session management policy with PCF 153.

At 438, SMF 145 selects UPF 140(1). SMF 145 may perform any of operations 220-250 (FIG. 2) in selecting UPF 140(1). For example, SMF 145 may first determine that the PDU session should be established with SRv6 transport capabilities. SMF 145 may thereafter identify a lowest latency connection for the PDU session, discover whether the service provider offers an IP address agnostic service, and determine whether the service provider allows for metadata exposure of the N6 interface using SRv6. Based on these factors, SMF 145 may conclude that UPF 140(1) is the optimal UPF for the PDU session, and therefore may select UPF 140(1). At 440, SMF 145 may send a session management policy modification to PCF 153. At 442, SMF 145 sends a session establishment request to UPF 140(1). At 444, SMF 145 receives a session establishment response from UPF 140(1).

At 446, an N1N2 message is transferred, via the Namf interface, between AMF 405 and SMF 145. At 448, AMF 405 sends a PDU session request to gNodeB 105 over the N2 interface. The PDU session request may be a Non Access Stratum (NAS) message. At 450, Access Network (AN) specific resource(s) are established between UE 102 and gNodeB 105. At 452, gNodeB 105 sends a PDU session request acknowledgment to AMF 405 via the N2 interface. At 454, UE 102 sends SRv6 uplink data to SRv6-capable UPF 140(1). At 456, AMF 405 sends a PDU session update session management context request to SMF 145 via the Nsmf interface. At 458, SMF 145 sends, to UPF 140(1), a session modification request via the N4 interface. At 460, UPF 140(2) sends downlink data to UE 102. At 462, UPF 140(1) sends session modification response to SMF 145 via the N4 interface. At 464, SMF 145 sends a PDU session update session management context response to AMF 405 via the Nsmf interface.

Figure 5:
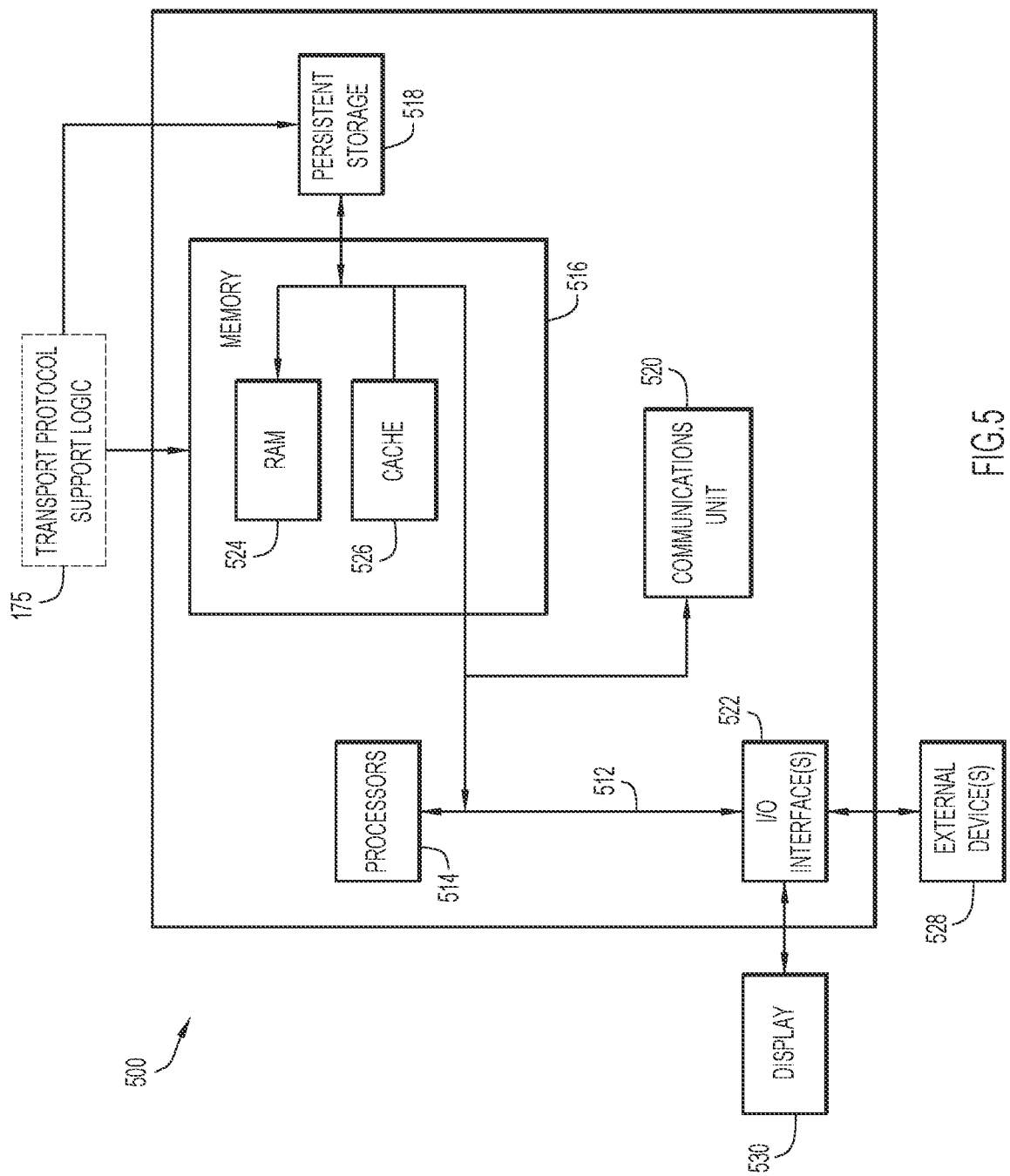
FIG. 5 illustrates a block diagram of a computing device configured to execute operations for network slice support of respective transport protocols, according to an example embodiment.

FIG. 5 illustrates a hardware block diagram of an example device 500 (e.g., a computing device configured to support SMF 145). It should be appreciated that FIG. 5 provides only an illustration of one embodiment and does not imply any limitations with regard to the environments in which different embodiments may be implemented. Many modifications to the depicted environment may be made.

As depicted, the device 500 includes a bus 512, which provides communications between computer processor(s) 514, memory 516, persistent storage 518, communications unit 520, and Input/Output (I/O) interface(s) 522. Bus 512 can be implemented with any architecture designed for passing data and/or control information between processors (such as microprocessors, communications and network processors, etc.), system memory, peripheral devices, and any other hardware components within a system. For example, bus 512 can be implemented with one or more buses.

Memory 516 and persistent storage 518 are computer readable storage media. In the depicted embodiment, memory 516 includes Random Access Memory (RAM) 524 and cache memory 526. In general, memory 516 can include any suitable volatile or non-volatile computer readable storage media. Instructions for transport protocol support logic 175 may be stored in memory 516 or persistent storage 518 for execution by computer processor(s) 514.

One or more programs may be stored in persistent storage 518 for execution by one or more of the respective computer processors 514 via one or more memories of memory 516. The persistent storage 518 may be a magnetic hard disk drive, a solid state hard drive, a semiconductor storage device, Read-Only Memory (ROM), Erasable Programmable ROM (EPROM), Flash memory, or any other computer readable storage media that is capable of storing program instructions or digital information.

The media used by persistent storage 518 may also be removable. For example, a removable hard drive may be used for persistent storage 518. Other examples include optical and magnetic disks, thumb drives, and smart cards that are inserted into a drive for transfer onto another computer readable storage medium that is also part of persistent storage 518.

Communications unit 520, in these examples, provides for communications with other data processing systems or devices. In these examples, communications unit 520 includes one or more network interface cards. Communications unit 520 may provide communications through the use of either or both physical and wireless communications links.

I/O interface(s) 522 allows for input and output of data with other devices that may be connected to device 500. For example, I/O interface(s) 522 may provide a connection to external devices 528 such as a keyboard, keypad, a touch screen, and/or some other suitable input device. External devices 528 can also include portable computer readable storage media such as database systems, thumb drives, portable optical or magnetic disks, and memory cards.

Software and data used to practice embodiments can be stored on such portable computer readable storage media and can be loaded onto persistent storage 518 via I/O interface(s) 522. I/O interface(s) 522 may also connect to a display 530. Display 530 provides a mechanism to display data to a user and may be, for example, a computer monitor.

Figure 6:
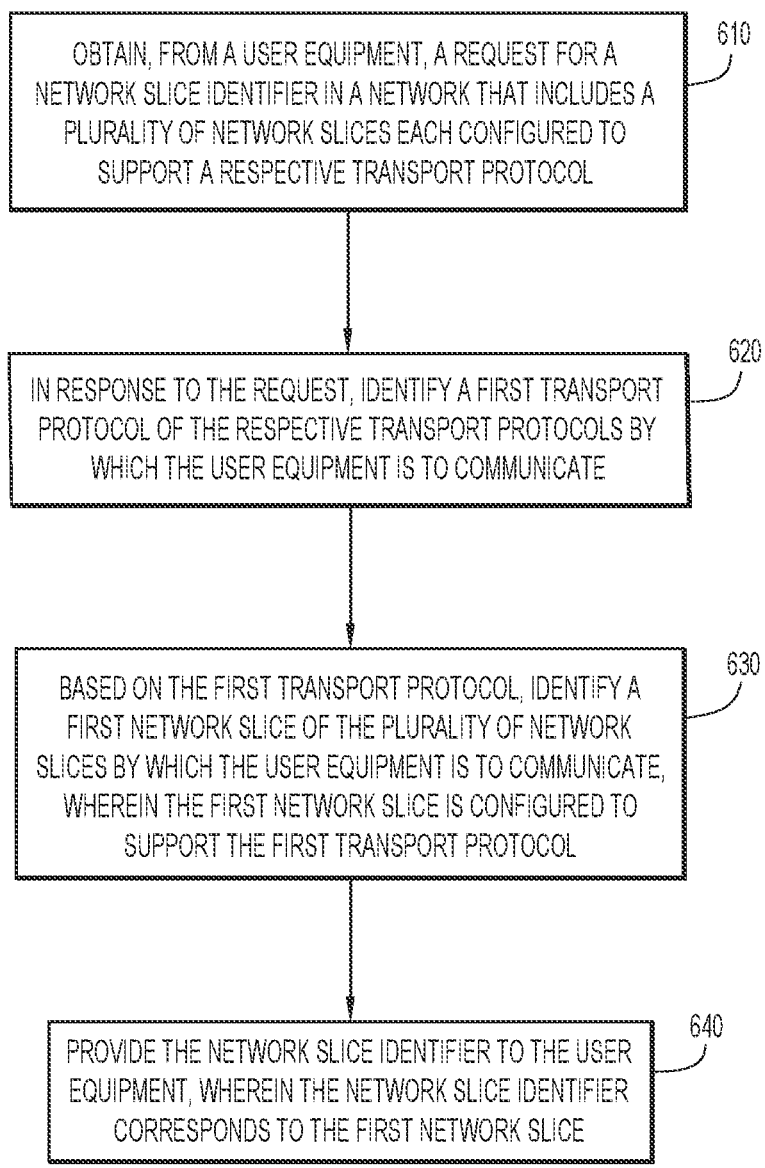
FIG. 6 illustrates a flowchart of a method for network slice support of respective transport protocols, according to an example embodiment.

FIG. 6 is a flowchart of an example method 600 for network slice support of respective transport protocols. Method 600 may be performed by an SMF (e.g., SMF 145). At 610, the SMF obtains, from a UE, a request for a network slice ID in a network that includes a plurality of network slices each configured to support a respective transport protocol. At 620, in response to the request, the SMF identifies a first transport protocol of the respective transport protocols by which the UE is to communicate. At 630, based on the first transport protocol, the SMF identifies a first network slice of the plurality of network slices by which the UE is to communicate, wherein the first network slice is configured to support the first transport protocol. At 640, the SMF provides the network slice ID to the UE, wherein the network slice ID corresponds to the first network slice.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, Personal Digital Assistant (PDA), mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, Compact Disc ROM (CD-ROM), Digital Versatile Disk (DVD), memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures to store information. The database system may be included within or coupled to the server and/or client systems. The database systems and/or storage structures may be remote from or local to the computer or other processing systems, and may store any desired data.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, EPROM, Flash memory, a Static RAM (SRAM), a portable CD-ROM, a DVD, a memory stick, a floppy disk, a mechanically encoded device, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a LAN, a WAN, and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, Instruction-Set-Architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, Field-Programmable Gate Arrays (FPGA), or Programmable Logic Arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In one form, a method is provided. The method comprises: obtaining, from a user equipment, a request for a network slice identifier in a network that includes a plurality of network slices each configured to support a respective transport protocol; in response to the request, identifying a first transport protocol of the respective transport protocols by which the user equipment is to communicate; based on the first transport protocol, identifying a first network slice of the plurality of network slices by which the user equipment is to communicate, wherein the first network slice is configured to support the first transport protocol; and providing the network slice identifier to the user equipment, wherein the network slice identifier corresponds to the first network slice.

In one example, identifying the first network slice includes identifying a first user plane function in the first network slice, wherein the first user plane function is configured to support the first transport protocol. In another example, identifying the first network slice includes identifying the first network slice based on a latency that the first network slice provides in communications associated with the user equipment. In yet another example, identifying the first network slice includes identifying the first network slice based on the first network slice supporting internet protocol address agnostic communications. In still another example, identifying the first network slice includes identifying the first network slice based on the first network slice supporting exposure of metadata of the first transport protocol.

In one example, the method further comprises: obtaining an indication that the first transport protocol is no longer available for the user equipment; in response to the indication, identifying a second transport protocol of the respective transport protocols by which the user equipment is to communicate; and based on the second transport protocol, identifying a second network slice of the plurality of network slices by which the user equipment is to communicate based on the second transport protocol, wherein the second network slice is configured to support the second transport protocol. In one example, the respective transport protocols include at least a segment routing protocol and a general packet radio service tunneling protocol.

In another form, an apparatus is provided. The apparatus comprises: a network interface configured to facilitate network communications; and one or more processors coupled to the network interface, wherein the one or more processors are configured to: obtain, from a user equipment, a request for a network slice identifier in a network that includes a plurality of network slices each configured to support a respective transport protocol; in response to the request, identify a first transport protocol of the respective transport protocols by which the user equipment is to communicate; based on the first transport protocol, identify a first network slice of the plurality of network slices by which the user equipment is to communicate, wherein the first network slice is configured to support the first transport protocol; and provide the network slice identifier to the user equipment, wherein the network slice identifier corresponds to the first network slice.

In another form, one or more non-transitory computer readable storage media are provided. The non-transitory computer readable storage media are encoded with instructions that, when executed by a processor, cause the processor to: obtain, from a user equipment, a request for a network slice identifier in a network that includes a plurality of network slices each configured to support a respective transport protocol; in response to the request, identify a first transport protocol of the respective transport protocols by which the user equipment is to communicate; based on the first transport protocol, identify a first network slice of the plurality of network slices by which the user equipment is to communicate, wherein the first network slice is configured to support the first transport protocol; and provide the network slice identifier to the user equipment, wherein the network slice identifier corresponds to the first network slice.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
    obtaining, from a user equipment, a request for a network slice identifier in a network that includes a first network slice including a first plurality of user plane functions configured to support a first transport protocol, and a second network slice including a second plurality of user plane functions configured to support a second transport protocol;
    in response to the request, identifying the first transport protocol, wherein the user equipment is to communicate with the first transport protocol;
    based on the first transport protocol, identifying the first network slice, wherein the user equipment is to communicate over the first network slice; and
    providing the network slice identifier to the user equipment, wherein the network slice identifier corresponds to the first network slice.

2. The method of claim 1, wherein identifying the first network slice includes identifying the first network slice based on a latency that the first network slice provides in communications associated with the user equipment.

3. The method of claim 1, wherein identifying the first network slice includes identifying the first network slice based on the first network slice supporting exposure of metadata of the first transport protocol.

4. The method of claim 1, further comprising:
    obtaining an indication that the first transport protocol is no longer available for the user equipment;
    in response to the indication, identifying the second transport protocol, wherein the user equipment is to communicate with the second transport protocol; and
    based on the second transport protocol, identifying the second network slice, wherein the user equipment is to communicate over the second network slice.

5. The method of claim 1, wherein the first transport protocol includes a segment routing protocol.

6. An apparatus comprising:
    a network interface configured to facilitate network communications; and
    one or more processors coupled to the network interface, wherein the one or more processors are configured to:
        obtain, from a user equipment, a request for a network slice identifier in a network that includes a first network slice including a first plurality of user plane functions configured to support a first transport protocol, and a second network slice including a second plurality of user plane functions configured to support a second transport protocol;
        in response to the request, identify the first transport protocol, wherein the user equipment is to communicate with the first transport protocol;
        based on the first transport protocol, identify the first network slice, wherein the user equipment is to communicate over the first network slice; and
        provide the network slice identifier to the user equipment, wherein the network slice identifier corresponds to the first network slice.

7. The apparatus of claim 6, wherein the one or more processors are further configured to:
    identify the first network slice based on a latency that the first network slice provides in communications associated with the user equipment.

8. The apparatus of claim 6, wherein the one or more processors are further configured to:
    identify the first network slice based on the first network slice supporting exposure of metadata of the first transport protocol.

9. The apparatus of claim 6, wherein the one or more processors are further configured to:
    obtain an indication that the first transport protocol is no longer available for the user equipment;
    in response to the indication, identify the second transport protocol, wherein the user equipment is to communicate with the second transport protocol; and
    based on the second transport protocol, identify the second network slice, wherein the user equipment is to communicate over the second network slice.

10. The apparatus of claim 6, wherein the first transport protocol includes a segment routing protocol or a general packet radio service tunneling protocol.

11. One or more non-transitory computer readable storage media encoded with instructions that, when executed by a processor, cause the processor to:
    obtain, from a user equipment, a request for a network slice identifier in a network that includes a first network slice including a first plurality of user plane functions configured to support a first transport protocol, and a second network slice including a second plurality of user plane functions configured to support a second transport protocol;
    in response to the request, identify the first transport protocol, wherein the user equipment is to communicate with the first transport protocol;
    based on the first transport protocol, identify the first network slice, wherein the user equipment is to communicate over the first network slice; and
    provide the network slice identifier to the user equipment, wherein the network slice identifier corresponds to the first network slice.

12. The one or more non-transitory computer readable storage media of claim 11, wherein the instructions further cause the processor to:
  identify the first network slice based on a latency that the first network slice provides in communications associated with the user equipment.

13. The one or more non-transitory computer readable storage media of claim 11, wherein the instructions further cause the processor to:
  identify the first network slice based on the first network slice supporting exposure of metadata of the first transport protocol.

14. The one or more non-transitory computer readable storage media of claim 11, wherein the instructions further cause the processor to:
  obtain an indication that the first transport protocol is no longer available for the user equipment;
  in response to the indication, identify the second transport protocol, wherein the user equipment is to communicate; and
  based on the second transport protocol, identify the second network slice, wherein the user equipment is to communicate over the second network slice.

15. The one or more non-transitory computer readable storage media of claim 11, wherein the first transport protocol includes a segment routing protocol or a general packet radio service tunneling protocol.

16. The method of claim 1, wherein the first transport protocol includes a general packet radio service tunneling protocol.

17. The method of claim 1, wherein the second transport protocol includes a segment routing protocol.

18. The method of claim 1, wherein the second transport protocol includes a general packet radio service tunneling protocol.

19. The apparatus of claim 6, wherein the second transport protocol includes a segment routing protocol or a general packet radio service tunneling protocol.

20. The one or more non-transitory computer readable storage media of claim 11, wherein the second transport protocol includes a segment routing protocol or a general packet radio service tunneling protocol.

\* \* \* \* \*